Patented Apr. 27, 1954

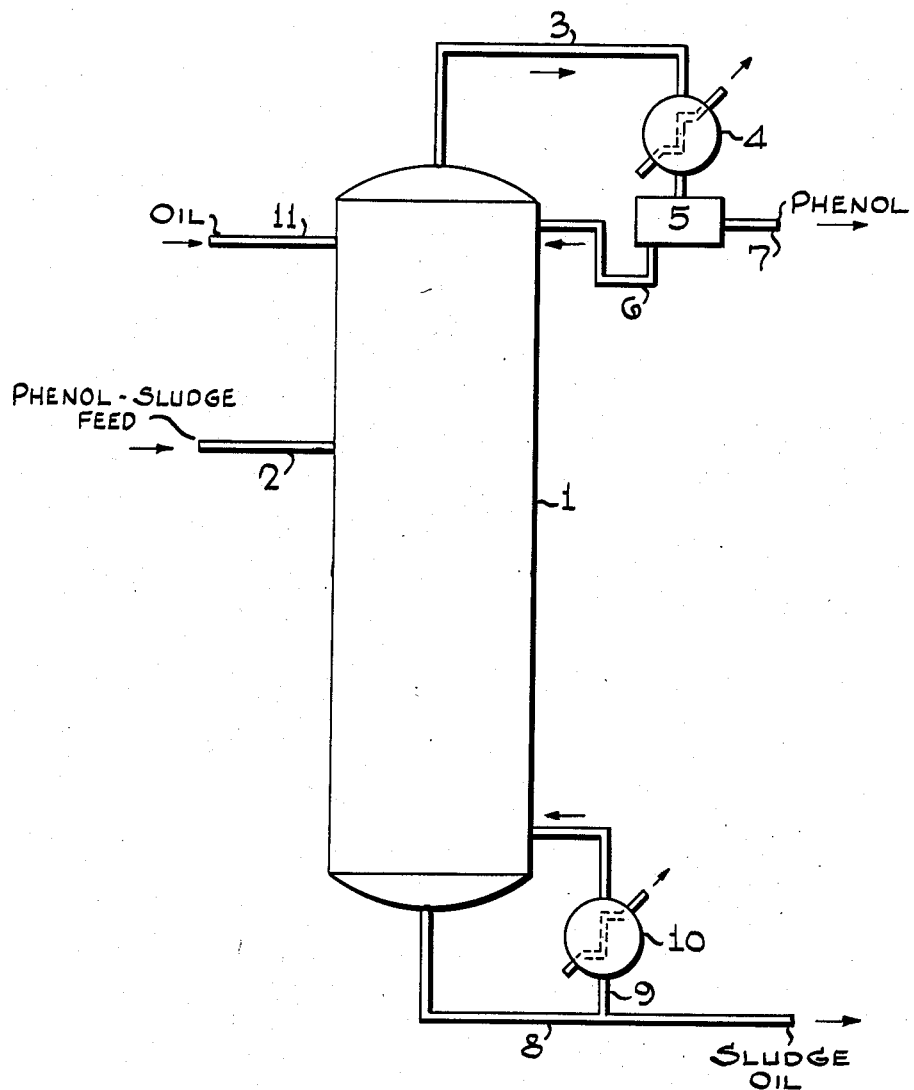

2,676,912

UNITED STATES PATENT OFFICE 2,676,912

PHENOL-SLUDGE SEPARATION

Daniel S. Maisel, Union, N. J., assignor to Standard Oil Development Company, a corporation of Delaware Application October 22, 1952, Serial No. 316,256

5 Claims. (Cl. 202—39.5)

This invention relates to a process of purifying phenol employed in extractive distillation separations of unsaturated hydrocarbons from benzene and toluene.

The purification of phenol contaminated by so-called "sludge" impurities is carried out in a fractional distillation zone, wherein efforts have to be made to remove the phenol as a fractionated distillate and to remove the "sludge" impurities as residual bottoms.

Reactive olefins and diolefins in the $C_6$–$C_7$ range tend to polymerize and tend to react with the phenol at temperatures used in separating these unsaturated hydrocarbons from benzene and toluene by extractive distillation with phenol as the solvent. Products of these reactions formed in extractive distillation columns boil close to, or higher than, the phenol. These sludge materials may build up to a proportion equal to the weight of the phenol in the extractive distillation bottoms or thus constitute from about 10 to 50 weight per cent of the total phenol and sludge mixture. It is, therefore, necessary to separate these sludge materials continuously or intermittently from at least some of the phenol that is recycled to the extractive distillation zone.

The separation of the described sludge materials from the phenol is made difficult by the dissimilar nature of the various compounds involved. Some of the sludge compounds are alkylation and condensation products of the phenol and unsaturated hydrocarbons. These products have physical properties of solubility and volatility more closely related to phenol than other polymer components of the sludge. They have been observed to have an abnormal enhanced volatility in the presence of the phenol which makes their separation more difficult than would be expected from a knowledge of their boiling points.

Actual difficulties encountered in operating a purifier tower for separating phenol from 10 to 50 weight percent concentration of sludge are partial plugging of the tower and poor fractionation even when high amounts of phenol were refluxed, e. g. 1 part reflux to 1 part distillate product recovered.

In accordance with the present invention, the purification is improved by adding a high boiling hydrocarbon oil at about or lower than refluxing temperatures near the top of the purification zone as will be described with reference to the accompanying drawing.

The drawing shows schematically a purification tower which receives the sludge contaminated phenol to be purified.

The contaminated phenol enters the tower 1 at an intermediate point from feed line 2. Tower 1 is equipped with necessary plates or packing as fractionating means. Distilled and fractionated phenol is withdrawn overhead from tower 1 by line 3 to cooling condenser 4, where distillate is collected in receiver 5. Cooling liquid in the cooling means 4 should be maintained at above the freezing point of phenol. Some of the distillate is refluxed by line 6. The remainder of the phenol distillate is removed as purified product by line 7. It may be desirable to condense only that portion of the overhead which is withdrawn as reflux. The overhead product can be fed to the extractive distillation tower as a vapor in which case its latent heat can be used to relieve load on reboilers in this tower.

Non-volatilized sludge materials are intended to flow downwardly through the stripping section of tower 1 below the feed point to be withdrawn by line 8. A portion of the bottoms may be returned by line 9 through a reboiler 10.

In accordance with the present invention an inlet line 11 for the high-boiling hydrocarbon oil is provided at the upper part of tower 1, preferably above the impure phenol feed charging point.

To demonstrate the operation of the invention, the following example is given:

Example

A phenol-sludge mixture containing 10 to 25% sludge was obtained from a benzene extract stripping column. The extracts were formed in making an extractive distillation of benzene concentrates containing 35 to 45 volume per cent benzene and 50 to 60% unsaturated $C_5$–$C_7$ hydrocarbons.

The phenol sludge mixture was fed the purifying tower, such as tower 1 in the drawing. Top vapor temperatures of 370° F. to 380° F. were maintained by using a reflux ratio of 1:1 (50% of total distillate refluxed). The bottom temperature was held in the range of 460° F. to 500° F.

Without adding hydrocarbon oil by line 11, it was noted that fractionation became poor, because a large amount of the sludge components distilled over with the phenol. The bottoms contained a substantial amount of phenol, e. g. about 50%, showing that stripping effectiveness was low.

To improve the operation a stream of gas oil hydrocarbons boiling in the range of 450° to 650° F. is passed continuously into the upper part of the purification tower at a temperature in the range of 250° to 380° F. and in a proportion of about equivalent to the weight proportion of the sludge component in the impure phenol feed. In this manner the bottoms liquid is about half composed of non-volatilized sludge components and half of the hydrocarbon oil.

Several advantageous effects are indicated to be obtained by adding the hydrocarbon oil. The phenol is given an enhanced relative volatility that facilitates its separation from the sludge components. The oil displaces the phenol which would otherwise be carried down by the sludge. The oil acts to prevent foaming and to reduce fouling in the lower parts of the tower and its reboiling section. The relatively cool oil added at the upper part of the tower reduces the amount of phenol distillate refluxing and thus increases the output of the tower.

A substantial amount of the low-boiling sludge components have been identified as having characteristics of cyclic ethers which boil at about 430 to 470° F. under 1 atmosphere. The hydrocarbon oil added for the purpose of the present invention may include hydrocarbon components of the same boiling range, but if a later recovery of these cyclic ethers is desired the oil should be made to have a higher initial boiling point, for example in the range of 500° to 650° F. or higher.

The nature of the hydrocarbon oil supplied to the purifier tower is not critical with respect to its composition except that it should be sufficiently higher-boiling than the phenol to avoid being distilled with the phenol. Preferably, the oil should be low in reactive unsaturated hydrocarbons to avoid reaction thereof with the phenol. However, some reaction may occur to form a small additional amount of sludge, which is withdrawn as bottoms.

In general, the present invention comprises improvement of the phenol-sludge separation by addition of a hydrocarbon liquid less volatile than the phenol under the distillation conditions, and the use of the hydrocarbon liquid in economical amounts for homogeneously mixing with about equal amounts of the sludge components.

The invention described is claimed as follows:

1. In a process of purifying phenol contained in a feed mixture with sludge materials comprising $C_5$-$C_7$ olefin and diolefin reaction products by fractional distillation the improvement which comprises adding into a fractionation zone where vapors of the phenol are being distilled from the sludge materials a hydrocarbon oil less volatile than the phenol, recovering the fractionated phenol as a distillate freed of sludge, and recovering the sludge mixed with said hydrocarbon oil as a bottoms product of said zone.

2. In the process of claim 1, continuously adding said hydrocarbon oil in an amount about equal to the amount of sludge material in said feed mixture.

3. In the process of claim 1, said hydrocarbon oil boiling above 450° F.

4. In the process of claim 1, said hydrocarbon oil being introduced into an upper part of said fractionation zone to act as reflux passing countercurrent to the vapors of the phenol being distilled from the sludge materials.

5. In the process of claim 1, said hydrocarbon oil boiling above volatile components of the sludge.

References Cited in the file of this patent

UNITED STATES PATENTS

| Number | Name | Date |
|---|---|---|
| 2,096,871 | Atkins | Oct. 26, 1937 |
| 2,107,265 | Archibald | Feb. 8, 1938 |
| 2,171,795 | Kautter | Sept. 5, 1939 |
| 2,417,886 | Redcay | Mar. 25, 1947 |
| 2,513,252 | Robertson | June 27, 1950 |
| 2,614,071 | Moise et al. | Oct. 14, 1952 |